Patented May 24, 1949

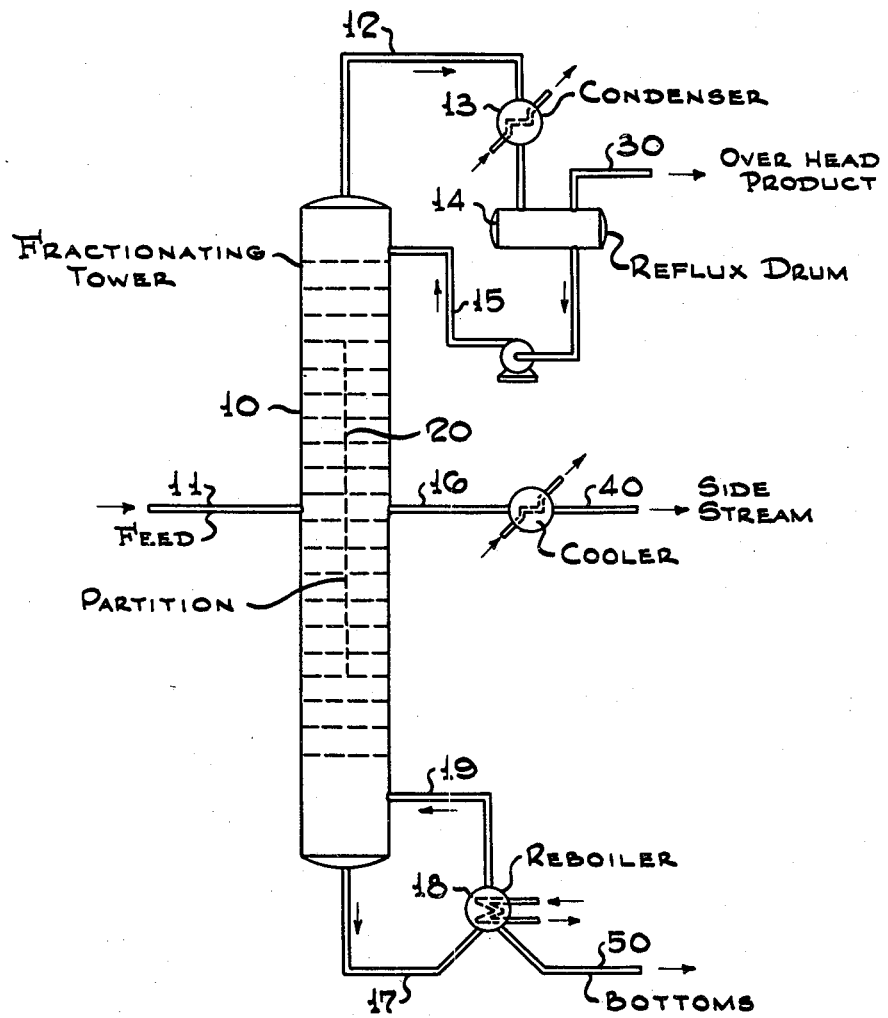

2,471,134

UNITED STATES PATENT OFFICE 2,471,134

FRACTIONATION APPARATUS

Richard O. Wright, Elizabeth, N. J., assignor to Standard Oil Development Company, a corporation of Delaware Application July 17, 1946, Serial No. 684,142

2 Claims. (Cl. 196—100)

This invention relates to fractional distillation, and in particular to a novel processing and apparatus for separating components of a composite fluid.

It is well known in the art to separate constituents of a composite fluid by effecting a distillation in a column containing contacting devices. Usually, in such towers, distinction is made between an overhead fraction and a heavier product separated as a distillation residue. Also, the separation of side stream products has been effected. It is generally true, however, that from a single distillation tower only two relatively well defined products may be obtained, the intermediate side stream product usually being contaminated with the lighter overhead and the bottom heavier components. The present invention is concerned with an improved rectification process and apparatus for carrying out such processing by which three relatively well defined products may be obtained from a single rectification operation.

In the prior art, vertical partitions and the separation of subsidiary fractionation zones have been made in order to obtain a side stream product substantially free from the more volatile constituents usually separated as the overhead product. The overcoming of contamination of the side stream product with the heavier constituents of the feed supply has generally been avoided in view of the subsequent fractionation of the side stream product for one or more particular advantages. In the processing of the present invention and in the particular apparatus of the invention, a side stream product is obtained from which separation of the relatively light overhead components and of the relatively heavier components concentrated in the distillation residue is effected.

It is an object of the invention to carry out rectification upon a composite fluid in a fractionating tower to permit the separation of a side stream product essentially pure or of narrow volatility range. Another object of the invention is the construction of a fractionating tower having an internal stripping section for the components of the overhead and bottoms products from the side stream product without adding materially to the size or cost of the equipment. Other objects and advantages will become apparent from the following description and illustration of a specific embodiment.

In the drawing, a vertical diagrammatic section through a fractionating tower and associated equipment designed according to the invention is presented. In the drawing, a multiplate tower 10, usually of the bubble cap type, is shown as being equipped with a feed supply line 11, an overhead vapor line 12, a condenser 13, a reflux drum 14, a reflux line 15, a side stream line 16, a bottoms line 17, a reboiler 18, a vapor return line 19, and a partition 20. The partition 20 is vertically disposed in the tower at about its middle section. About the middle section also the feed line 11 is connected and also the side stream withdrawal line 16 on the opposite side of the partition 20 from the feed line 11. The partition 20 extends a number of plates above and below the plate upon which the feed supply enters. In the particular illustration relating to a 30-plate tower, the partition extends 10 plates above and below the plate upon which the feed supply through line 11 enters. The heat for operating the tower is supplied by means of reboiler section 17, 18 and 19. Through the three lines 30, 40 and 50, the overhead, side stream and distillation residue products are recovered respectively.

In the processing according to the invention in the apparatus of the invention as illustrated for one embodiment in the drawing, the feed supply enters through line 11. Separation of the constituents of the feed according to their volatility characteristics occurs in the tower as a result of the heat supplied to the tower from the reboiler system 17, 18 and 19.

For purposes of the specific illustration, a 30-plate tower with a dividing partition extending from the fifth plate for 20 plates upwards, as illustrated in the drawing, is employed. To this tower is supplied low molecular weight, normally gaseous hydrocarbon mixture obtained from refinery depropanizer overhead which contains mainly methane, ethane, propane, the butanes, and a small percentage of $C_5$ and higher hydrocarbons. With a feed of composition:

| | Feed, mol per cent |
|---|---|
| Methane | 2.0 |
| Ethane | 27.5 |
| Propane | 68.0 |
| Butane+ | 2.5 | supplied to the tower after passing through heat exchangers at a temperature of 100° F., the following products were obtained:

| | Overhead | Side Stream | Bottoms |
|---|---|---|---|
| | Mol Per Cent | Mol Per Cent | Mol Per Cent |
| Methane | 6.1 | | |
| Ethane | 83.9 | 0.2 | |
| Propane | 10.0 | 99.5 | 5.0 |
| Butane | | 0.3 | 95.0 |

In this processing effected under 500 lbs. per sq. in. pressure, a temperature of about 290° F. was maintained in the reboiler section 18 and 19; overhead vapor exit 12 temperature of 120° F.; a reflux supply 15 temperature of 95° F., and side stream withdrawal line 16 temperature of 190° F.

What is claimed is:

1. A vertical column fractionating tower provided with a single feed inlet approximately midway of the top and bottom of the tower, an overhead outlet at the top of the tower, and a bottoms outlet at the bottom of the tower, said tower having a vertical partition dividing an intermediate portion of the tower and a side stream outlet positioned on the opposite side of the tower from the said feed inlet and at about the same vertical height on said tower, whereby said feed inlet and said side stream outlet are separated by said vertical partition and whereby said vertical partition extends approximately equidistant above and below the said feed inlet and the said side stream outlet.

2. A vertical fractionating tower having a partition extending vertically through a mid-section of said tower and dividing it into a feed stream fractionating zone and a separate side stream fractionating zone, both of said zones opening at both ends into common fractionating zones above and below said partition, a feed inlet connecting with a mid-portion of said feed stream fractionating zone, a side stream outlet connecting with a mid-portion of said side stream fractionating zone on the opposite side of said partition from said feed inlet, said vertical partition extending a distance equivalent to several fractionating plates, both above and below both said feed inlet and said side stream outlet to provide means for sharply fractionating the side stream product from both relatively lighter and heavier components of the feed.

RICHARD O. WRIGHT.

REFERENCES CITED

The following references are of record in the file of this patent:

UNITED STATES PATENTS

| Number | Name | Date |
| --- | --- | --- |
| 1,915,681 | Luster | June 27, 1933 |